July 21, 1970 B. A. MACKEY, JR., ET AL 3,521,405
DRILL GRINDING APPARATUS
Filed Feb. 14, 1968 4 Sheets-Sheet 2

INVENTORS
BRUCE A. MACKEY JR.
& EDWARD M. NAURECKAS
BY Dominik, Stein & Knechtel
ATTORNEYS

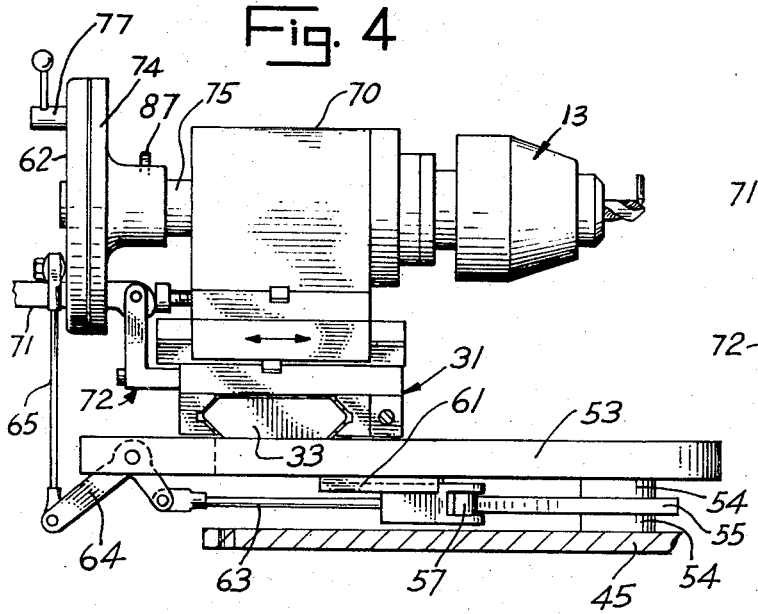

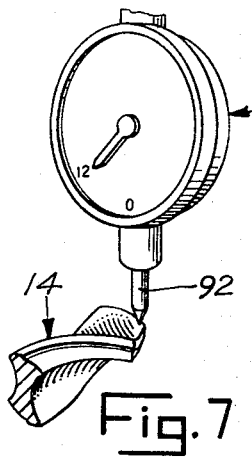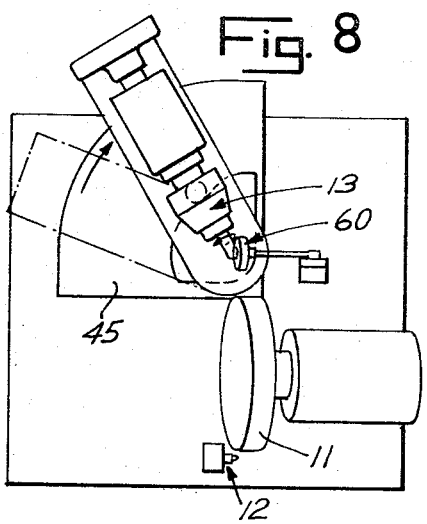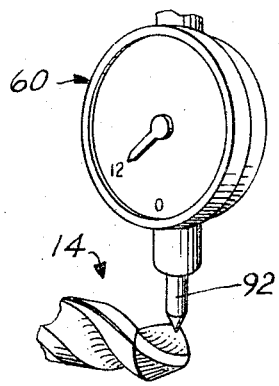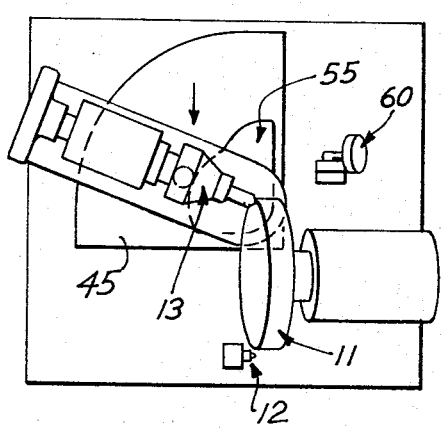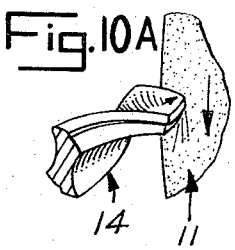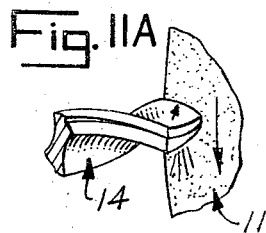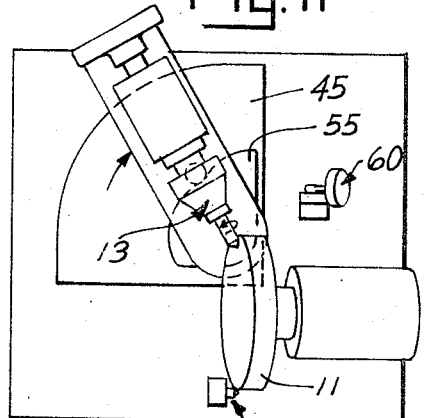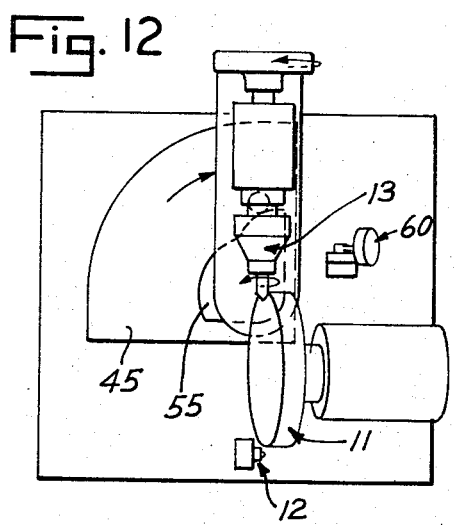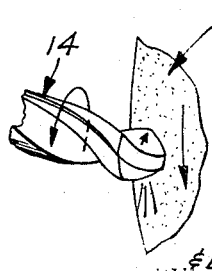

United States Patent Office 3,521,405
Patented July 21, 1970

3,521,405
DRILL GRINDING APPARATUS
Bruce Alexander Mackey, Jr., Libertyville, and Edward Martin Naureckas, Gurnee, Ill., assignors, by mesne assignments, to Radial Lip Machine Corporation, Wilmette, Ill., a corporation of Illinois
Filed Feb. 14, 1968, Ser. No. 705,393
Int. Cl. B24b 3/30
U.S. Cl. 51—5                                             15 Claims

ABSTRACT OF THE DISCLOSURE

A drill grinding apparatus for grinding cutting edges on a drill is disclosed having a support surface and a flat grinding surface fixed to the support surface and disposed parallel to and at an angle from the vertical plane of a reference line to provide a relief angle on a drill. A drill chuck for supporting the drill and a swing arm pivotally affixed to the support surface is adapted to be pivotally operated about a pivot point in a horizontal plane parallel to the horizontal plane of a reference line, the pivot point being fixed and establishing a radius with respect to the reference line about which said drill is moved. The drill chuck is fixed to the swing arm with its centerline and the centerline of the drill disposed in the horizontal plane of the reference line and offset a predetermined distance from the pivot point.

---

This invention relates, in general, to grinding apparatus and, in particular, to grinding apparatus for grinding and/or sharpening drills. More particularly still, the invention relates to grinding apparatus for grinding drills in a fashion such as to provide improved cutting lips on them.

In United States patent application Ser. No. 714,393 filed Feb. 14, 1968, now Pat. No. 3,443,459 granted May 13, 1969, there is disclosed a drill having multiple reliefs and curved cutting lips formed on it, for improving its operation and extending its useful life. Prior to the advent of the grinding apparatus of the present invention, these geometries were ground on the drills, by hand. An experienced operator can do a reasonably good job of properly grinding these reliefs on any one drill, however, it is virtually impossible for him to consistently grind identical reliefs on a number of drills of the same diameter. Also, the multiple reliefs provided on drills of different diameters varies, so that the operator's difficulties are compounded since he must not only properly grind the multiple reliefs on a drill but he must first determine the proper multiple reliefs required for a particular diameter drill. It will be appreciated that, under such conditions, the reject rate is generally quite high.

Accordingly, it is an object of the present invention to provide improved grinding apparatus for grinding and/or sharpening drills.

Another object is to provide improved grinding apparatus for grinding drills in a fashion such as to provide curved cutting lips thereon which may join tangentially with the drill diameter.

A further object is to provide grinding apparatus of the above type which is adapted to provide multiple reliefs on a drill.

Another object is to provide grinding apparatus of the above type which is capable of consistently grinding the same multiple reliefs.

Still another object is to provide grinding apparatus of the above type which is capable of consistently grinding the same multiple reliefs on virtually any diameter drill. In this respect, it is contemplated that the grinding apparatus be easily and quickly set up both to grind these multiple reliefs on the different diameter drills, and to change the shape of the curved lips and the multiple reliefs within a driven drill diameter.

A still further object is to provide grinding apparatus of the above type constructed and operated in a fashion such that reliance on the operator's ability is minimized.

Still another object is to provide grinding apparatus of the above type which is operable by one man.

Another object is to provide apparatus of the described type which is relatively simple in construction even though it is required to perform a relatively complex operation in grinding multiple reliefs on a drill.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 4 is a side plan view of the drill chuck of the grinding apparatus;

FIG. 5 is an end plan view of the drill chuck, as illustrated in FIG. 4;

FIG. 6 is a partial side plan view of the grinding apparatus, generally illustrating the slide assemblies for the drill chuck and the manner in which the grinding wheel thereof is angularly positioned;

FIG. 7 is a perspective view, generally illustrating one test position of the drill to be ground;

FIG. 8 is a diagrammatic top view of the grinding apparatus, generally illustrating the manner in which its drill chuck is angularly pivotally positioned to locate the drill for a second test;

FIG. 9 is another perspective view like FIG. 7, generally illustrating the manner in which the drill is tested in a second position;

FIG. 10 is a diagrammatic top view of the grinding apparatus, generally illustrating its drill chuck in its initial position prior to grinding a cutting lip on a drill;

FIG. 10A is a partial perspective view, generally illustrating the manner in which the drill initially is engaged with the grinding wheel of the grind apparatus;

FIG. 11 is a diagrammatic top view of the grinding apparatus, illustrating the drill chuck just prior to the time that the cam follower of the apparatus is operated to rotate the drill;

FIG. 11A is a partial perspective view, generally illustrating the position of the drill with respect to the grinding wheel when the drill chuck is positioned as illustrated in FIG. 11;

FIG. 12 is a diagrammatic top view like FIG. 11, illustrating the position of the drill chuck at the end of a grinding operation; and FIG. 12A is a partial perspective view, generally illustrating the position of the drill with respect to the grinding wheel when the drill chuck is positioned as illustrated in FIG. 12.

Similar reference characters refer to similar parts throughout the several views of the drawings.

Figure 1:
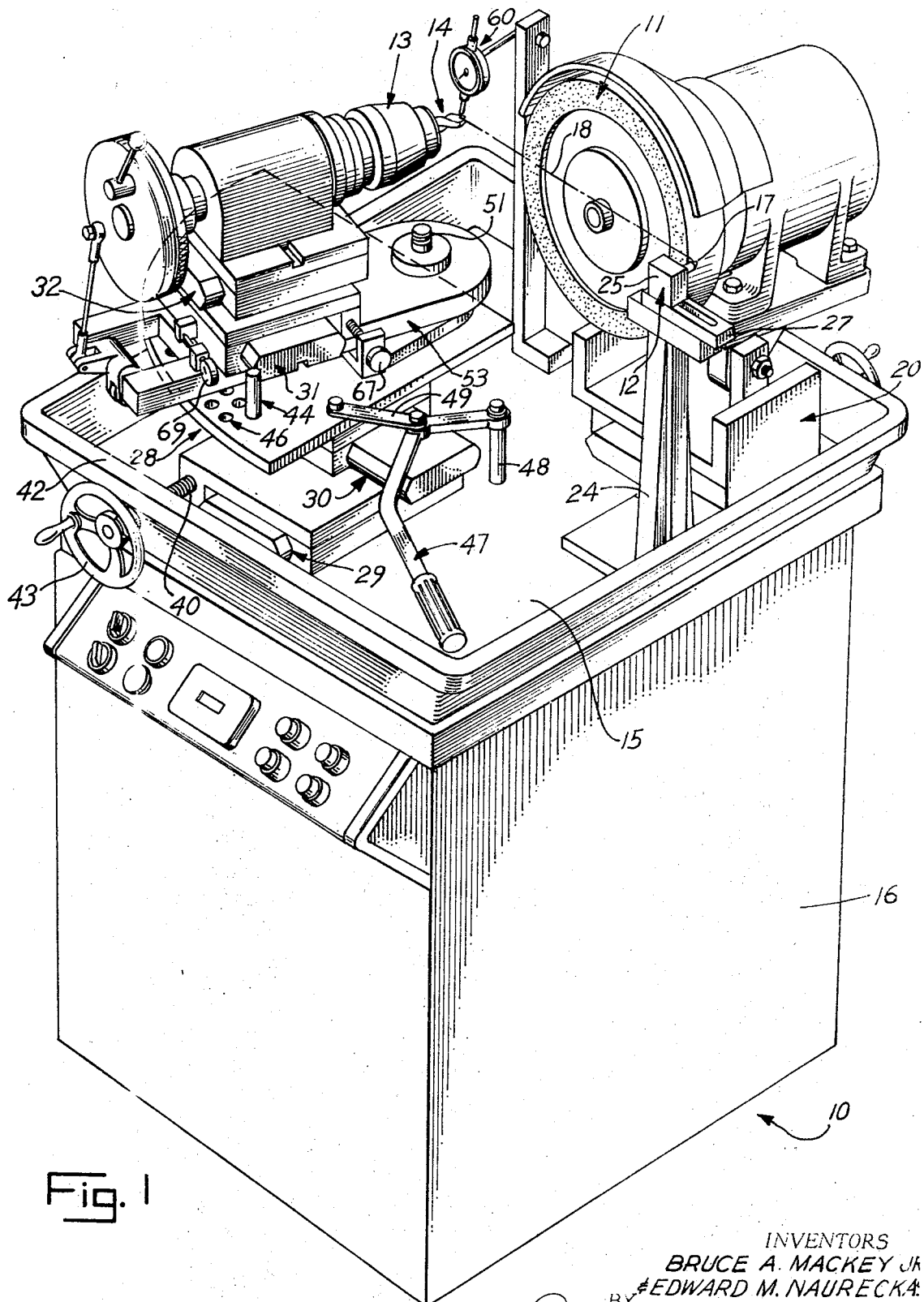
FIG. 1 is a perspective view of a grinding apparatus exemplary of the invention.

Referring now to the drawings, in FIG. 1 there is illustrated a drill grinding apparatus 10 exemplary of the invention including, as its principal components, a grinding wheel 11, a diamond dresser 12, and a drill chuck 13, each of which is supported upon the top surface 15 of a cabinet 16. The drill chuck 13 is adapted to be manipulated, in a fashion fully described below, to grind a drill such as the drill 14 so as to provide thereon a cutting point of the type briefly described above, and fully described and claimed in said copending application, Ser. No. 714,393. The apparatus 10 can be used to provide both conical or cylindrical reliefs on a drill. In most cases, however, a conical relief is preferred since a more uniform relief angle can be provided. Accordingly, the apparatus is shown and described as it is set up to provide a conical relief.

The reference point for the apparatus 10 is a line scribed in space by the tip of the diamond 17 of the diamond dresser 12, and all of the components of the apparatus 10 and all measurements use this line for three dimensional reference, as explained more fully below. This line is generally indicated by the reference numeral 18 in the drawings.

Figure 2:
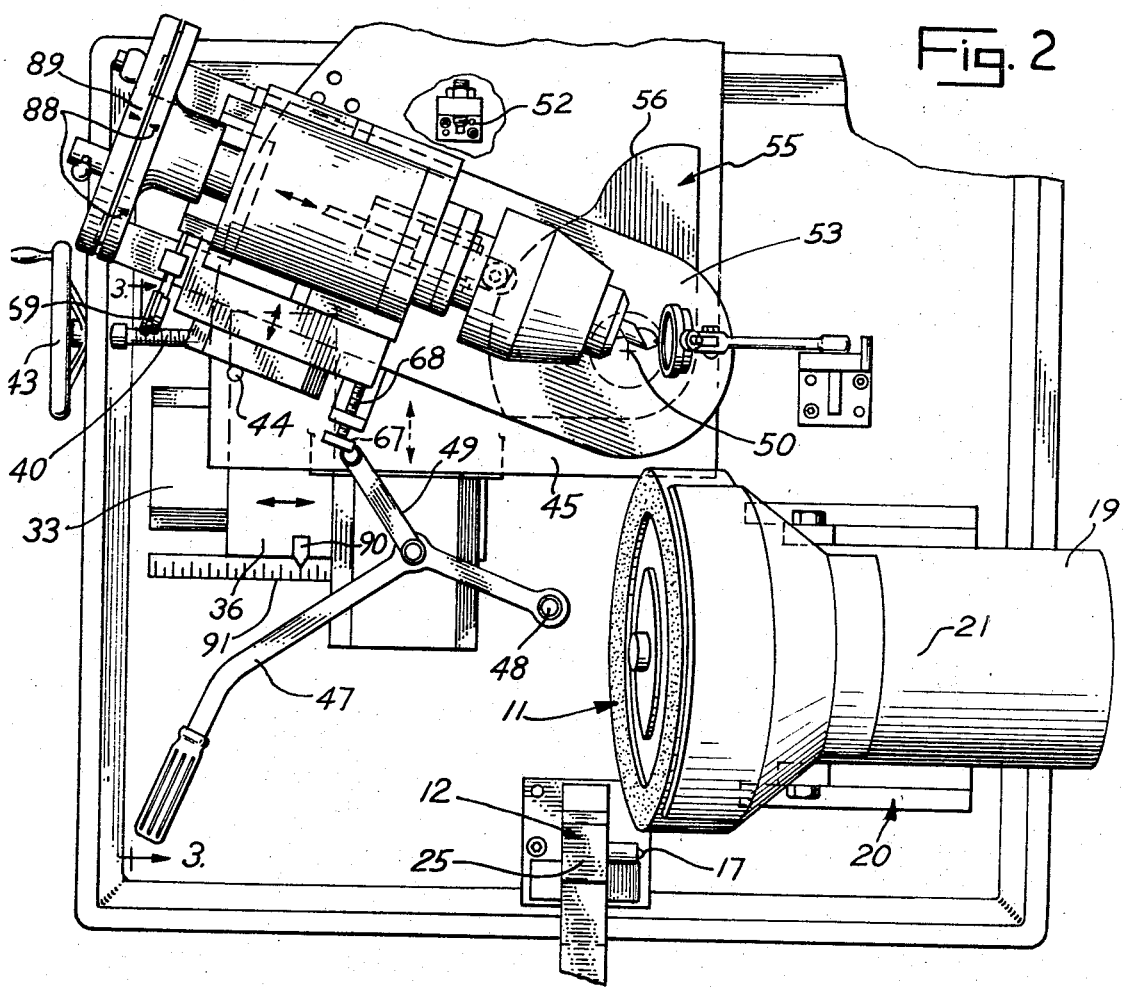
FIG. 2 is a top plan view of the grinding apparatus of FIG. 1, generally illustrating its construction.

The grind wheel 11 is affixed to and driven by motor means 19, which can be an electric motor, and the latter is adjustably pivotally supported by a pivot support structure 20, in a fashion such that the longitudinal axis 21 of the grinding wheel 11 and the motor means 19 is disposed perpendicular to the line 18, as illustrated in FIG. 2. The motor means 19 furthermore is pivotally adjustable in a fashion such that the angle α between the face of the grinding wheel 11 and the vertical plane of the scribed line 18 can be angularly adjusted, as indicated in FIG. 6. Since the pivot pin is vertically disposed, the conical relief angle ground on a drill is established by the angle α, and the relief angle, in turn, is dependent upon the drill size and the particular material to be drilled. A grinding wheel, as opposed to another type of grinding surface such as a grinding belt, is preferred because of the ease with which it can be rotated, angularly adjusted and re-faced, however, other grinding surfaces can be used so long as they are adapted to function in the described fashion.

Figure 3:
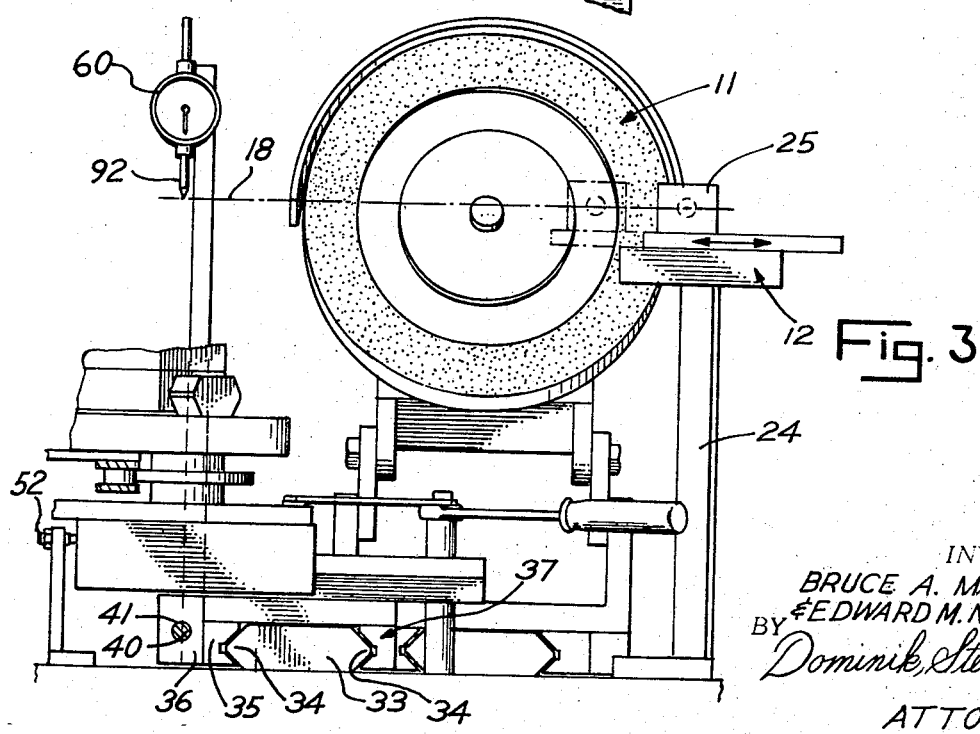
FIG. 3 is a partial front plan view of the grinding apparatus of FIG. 1.

The diamond dresser 12 is fixedly supported upon a support pedestal 24, and includes a mounting block 25 supporting its diamond 17. This mounting block 25 is fixedly secured to a guide 27 which is adapted to slidably move the mounting block 25 and hence the diamond 17, along the scribed line 18, to re-face the grinding wheel 11, as illustrated in FIG. 3. The grinding wheel 11 preferably is re-faced after each of the cutting lips and/or multiple reliefs is ground on a drill so that the exact reference line is established or maintained during each grinding operation. If the grinding wheel is permitted to wear, it will be appreciated that the relationship between each of the multiple reliefs will vary since extremely close tolerances are involved. The pivot support structure 20 is slidably mounted for adjustment along the longitudinal axis 21, to position the grinding wheel 11 with respect to the diamond dresser 12 so that it can be re-faced. A threaded adjustment screw 26 which can be threadedly adjusted to adjust the position of the grinding wheel 11 in a micrometer-like fashion preferably is provided for this purpose, so that the grinding wheel can be positioned to remove the least amount of material possible while re-facing it.

The drill chuck 13 which preferably is a Jacobs rubber flex segmented collet in combination with an Erickson true flexure collet is affixed to a multiple slide assembly 28 including adjustable slides 29–32 which are individually slidably adjustable to fixedly position the drill 14 with respect to the grinding wheel 11 to grind the above-mentioned cutting lips and multiple reliefs on it. Each of these slides 29–32 is generally of like construction and is of the type generally well-known in the art including an inner slide member 33 which is slidably retained within an outer slide member 36. Caged bearing assemblies (not shown) of the type manufactured by INA Fafnir Corporation generally are disposed between the matingly beveled side walls 34 and 35 of the slide members 33 and 36, respectively, and generally a wall portion like the wall portion 37 of the slide member 36 is adapted to be adjustably positioned to align the slide member 33 for straight-line movement.

In the illustrated embodiment the slide member 33 of the slide 29 is fixedly secured to the top surface 15 of the cabinet 16 with its longitudinal axis perpendicularly disposed to the scribed line 18. The slide member 36 of the slide 29 has a threaded screw 40 affixed within a correspondingly threaded bore 41 formed in it, which screw is extended through and fixedly rotatably retained within an aperture (not shown) in a wall 42 about the top surface 15 of the cabinet 16. A wheel 43 is affixed to its end, and by turning the wheel 43, the screw 40 can be threaded into or out of the bore 41 to longitudinally position the slide member 36 with respect to the slide member 33. The location of member 36 of slide 29 is used to adjustably position the slide assembly 28, to set the radius which the drill chuck 13 swings about a pivot point 50, with respect to the scribed line 18, in a manner and for reasons set forth more fully below.

The slide member 33 of the slide 30 is fixedly secured atop the slide member 36 of the slide 29 so as to be perpendicularly disposed with respect to it, as can be best seen in FIG. 6. Its slide member 36 therefore moves longitudinally, parallel to the scribed line 18.

A quadrant plate 45 which has a shape generally corresponding to one quadrant of a circle is fixedly secured atop the slide member 36 of the slide 30, as can be best seen in FIGS. 1 and 6. This quadrant plate 45 has a number of stop pin apertures 46 for receiving a stop pin 44 formed in it, in two spaced-apart rows adjacent its arcuate peripheral edge. A lever arm 47 is pivotally affixed to a pivot pin 48 secured to the top surface 15 of the cabinet 16, and has a linkage arm 49 affixed to it and to the quadrant plate 45. The quadrant plate 45 and hence the slide member 36 of the slide 30 to which it is affixed can be slidably positioned, by pivotally swinging the lever arm 47 about the pivot pin 48. A stop 52 (FIGS. 2 and 3) is positioned to be engaged by the slide member 36 of the slide 30, to limit the travel of the quadrant plate 45. The stop 52 also locates the drill chuck 13 with respect to a gauge 60, so that the latter can be used to angularly align the drill supported by the drill chuck 13.

The quadrant plate 45 also supports a pivot pin 51 forming the pivot point 50 and, as can be best seen in FIGS. 1–3 and 6, this pivot pin 51 has a swing arm 53 fixedly and pivotally secured to it. The swing arm 53 is held in spaced relation to the plate 45, by means of a pair of spacers 54 and a cam plate 55 which is disposed between them. This cam plate 55 is fixed with respect to the swing arm 53 and has a cam surface 56 (FIG. 2) of a predetermined configuration which is engaged by a cam follower 57. The cam follower 57 is slidably supported within a pair of guides 61 (FIG. 4) secured beneath the swing arm 53, and is coupled to a back plate 62 for rotating the latter in a manner described below, by means of a linkage assembly including linkage arms 63–65.

The slide members 33 of the slide 31, as can be best seen in FIGS. 1, 4 and 6, is fixedly secured atop the swing arm 53 and is perpendicularly disposed with respect to its longitudinal axis. The slide member 36 of the slide 31 has a micrometer-type threaded screw 68 affixed to it, for adjustably positioning it. A gauge 69 also is provided for determining the degree to which it has been longitudinally displaced. This micrometer-type adjustment and gauge is provided since the slide 31 is used to adjustably position the center line of the drill 14 from the pivot point 50, and this adjustment generally is quite small in magnitude but yet critical.

The slide member 33 of the slide 32 is affixed to the top of and is perpendicularly disposed to the slide member 36 of the slide 31, as can be best seen in FIG. 5. A drill chuck support 70 is fixedly secured atop the slide member 36 of the slide 32 and supports the drill chuck 13 in a fashion such that the latter can be adjustably positioned along the longitudinal center line of the slide 32. A lever arm 71 is coupled to a cam assembly 72 and is manualy operable by an operator to adjustably position the drill chuck 13.

The drill chuck 13 is affixed to a drill chuck shaft 75 which is rotatably supported by the drill chuck support 70. A lock plate 74 is adapted to be fixedly secured to the end of the drill chuck shaft 75, by means of a set screw 87. This lock plate 74 is in face-to-face sliding contact with the back plate 62, and has a number of locating apertures 76 in it for receiving the end of a positioning lock 77 affixed to the back plate 62. Each of these locating apertures 76 is appropriately marked on the peripheral edge of the lock plate 74, by indexing indicia 88 which may be scribed lines, as illustrated in FIG. 2. The back plate 62 has a reference index 89 which may be a scribed arrow as illustrated provided on it in cooperative relationship with the indexing indicia 88, for indexing the lock plate 74, in a manner described below. The lock plate 74 can be rotated by operating the handle 78 of the positioning lock 77 approximately 90°, which action retracts and releases the end of the positioning lock from a locating aperture 76. The lock plate 74 then can be rotated and the positioning lock 77 released to again lockingly engage its end in another one of the locating apertures. The locating apertures 76 are used to angularly position the drill 14 to grind the multiple reliefs on it. In addition, when the back plate 62 is lockingly affixed to the lock plate 74, by the positioning lock 77, the drill chuck 13 is rotated through the medium of the cam plate 55, the cam follower 57, the linkage assembly including linkage arms 63–65, the back plate 62, and the lock plate 74 to rotate the drill 14 to generate the cutting edge on it, in a manner more fully described below.

The drill chuck 13 further is supported atop the cabinet 16 at a height such that its longitudinal axis or centerline is at the exact height of the scribed line 18, as can be best seen in FIG. 1. The longitudinal axis or centerline of the drill 14 therefore also is at the exact height of the scribed line 18. As explained more fully below, the drill 14 must be properly angularly positioned before grinding it, and the gauge 60 is provided for this purpose. The gauge 60 is affixed to the end of a support arm 81 which is pivotally affixed to a support pedestal 82. A stop 83 is affixed to the support pedestal 82 and is engaged by the support arm 81 as the latter is pivotally operated, to locate the tip of the gauge's indicator spindle 85 at the intersection point of the drill chuck's longitudinal axis and the scribed line 18, as can be best seen in FIGS. 1 and 6. The support arm 81 also is arranged to be pivoted rearwardly against a stop 84, to position it out of the way when not in use.

Now that the construction of the grinding apparatus has ben described, the manner in which a drill 14 is located and aligned in the drill chuck 13 and the manner in which the latter is manipulated to grind the cutting lips and the multiple reliefs on the drill can be described. In setting up the grinding apparatus 10, the size of the drill, the particular material to be drilled with it, the settings for the various slides 29–32 and the grinding wheel 11, and the cam plate 55, needed to provide the proper cutting lips and multiple reliefs on the drill, is determined. This information advantageously can be predetermined and prepared in table form so that it can be easily and quickly determined by merely referring to the table. The lever arm 47 then is operated to slidably position the slide member 36 of the slide 30 against the stop 52. This positions the drill chuck 13 with respect to the gauge 60, so that the latter can be used to angularly or rotatably position the drill which is to be ground.

Next, the slides 29 and 31 are positionally adjusted, in accordance with the predetermined settings, to establish the necessary radius about the pivot point 50 and the distance that the longitudinal axis or centerline of the drill to be ground has to be offset from the pivot point 50, respectively, in order for the cutting lips to join with the drill diameter in an appropriate predetermined relationship. The slides 29 and 31 are positionally adjusted by rotating the wheel 43 and the knob 67, respectively. An indicator 90 can be affixed to the movable slide member 36 of the slide 29 and adapted to cooperate with an appropriately calibrated scale 91 on the top surface 15 of the cabinet 16, to set the slide 29. The slide 31 is properly positioned, by means of the gauge 69 which is adapted to indicate its setting or location.

A drill such as the drill 14 now is loosely placed within the drill chuck 13, and the support arm 81 is pivotally operated to position the gauge 60 in its test position, as illustrated in FIG. 6. As indicated above, the angular or rotational positioning of the drill in the drill chuck 13 prior to grinding it is critical and, in order to properly grind it, the drill must be located within a 5° tolerance. The angular or rotational positioning of the drill is accomplished by reference to its flute profile shape and its web thickness, since the geometry of a drill, other than a spade drill, is a continuous series of varying curves and normally each drill is slightly different in view of a manufacturer's inability to maintain exact dimensions. This is illustrated in FIGS. 7–9. The lock plate 74 is rotated to align the indexing indicia 88 on it which is appropriately marked to indicate the start of a grinding cycle with the reference index 89 on the back plate 62, and then lockingly coupled to the back plate 62. The drill chuck 13 then is adjusted forward against its stops (not shown), and the drill 14 is extended out of the drill chuck so that the tip of the spindle 92 of the gauge 60 engages the drill just rearwardly of its tip, as indicated in FIG. 7. The least amount possible of the drill tip should extend beyond the tip of the spindle 92, since this is the amount of material which will be removed. The drill 14 then is rotated, until an arbitrary reading, preferably as low as possible, such as 12, as illustrated, is indicated on the gauge 60. The drill chuck 13 now is tightened to securely support the drill. The swing arm 53 next is swung about the pivot pin 51, as illustrated in FIG. 8, to a predetermined angular position indicated by a reference mark which is scribed on the quadrant plate 45 and which is keyed to the cam plate 55 being used. In this position, the cam follower 57 is operated to rotate the drill 14, and the tip of the spindle 92 now is positioned on the flute of the drill at a point substantially corresponding to the point at which the cutting lip of the drill will start to revolve away from the grinding wheel 11 during the grinding thereof. The reading on the gauge 60 is observed, and the drill chuck 13 is rotated, by loosening the set screw 87 and rotating the drill chuck shaft 75, to angularly adjust the position of the drill so that the same arbitrary reading such as 12 is again indicated on the gauge. The drill chuck 13 now is again lockingly coupled to the drill chuck shaft 75, by tightening the set screw 87.

The stop pin 44 next is inserted into a predetermined one of the stop pin apertures 46, and the swing arm 53 is pivoted or swung about the pivot pin 51 until it engages against the stop pin 44, as illustrated in FIG. 10. Gauge 60 is positioned out of the way, by pivotally swinging the support arm 81 against the stop 83, and the lever arm 47 is operated to slidably adjust the slide member 36 of the slide 30 against a stop (not shown), in which position, the drill chuck 13 is located or aligned in proper working relationship with the grinding wheel 11.

The grinding wheel 11 is adjusted to establish the predetermined angle α required to grind the required relief or reliefs on the drill 14. Motor means 19 is energized to rotate the grinding wheel 11, and a lubricant is splashed onto the surface of the grinding wheel, in an appropriate manner.

The drill chuck 13 is now advanced to engage the drill 14 with the grinding wheel 11, by operating the lever arm 71, as generally illustrated in FIGS. 10 and 10A. The drill chuck can be advanced until the slide member 36 of the slide 32 engages its stops, or several passes can be made and the drill chuck advanced during each pass until the slide member 36 does engage its stops. The swing arm 53 is pivotally operated, about the pivot pin 51, to grind the cutting lip on one flute of the drill, generally as illustrated in FIGS. 11 and 11A. The cam follower 57 affixed beneath the swing arm 53 engages the cam plate 55, and when the swing arm 53 is in the position illustrated in FIG. 11, the cam follower 57 operates the linkage arms 63–65 in a fashion such as to cause the back plate 62 to rotate, as the swing arm is pivoted against its stops, in the position illustrated in FIG. 12. The back plate 62, in turn, being drivingly coupled to the lock plate 74, by means of the positioning lock 77, causes the drill chuck 13 to rotate. By rotating the drill 14 in this described fashion, its cutting edge is maintained in proper engagement with the grinding wheel 11, or the scribed line 18, to provide the required relief on it.

The positioning lock 77 now is operated to disengage its end from the locating aperture 76, the locking plate 74 is rotated 180°, and the positioning lock is released so as to again engage its end within another one of the locating apertures 76. As indicated above, these locating apertures 76 are appropriately marked with the indexing indicia 88 so that the proper one can be easily and quickly ascertained. Thereafter, the drill chuck 13 is manipulated in the same fashion to provide the desired cutting lip on the opposite or other flute of the drill 14.

If the multiple reliefs of the type disclosed in the above-mentioned copending application are to be provided on the drill 14, the positioning lock 77 is again disengaged and the locking plate 74 is rotatably adjusted until the reference index 89 on the back plate 62 is properly aligned with the appropriately marked one of the indexing indicia 88 on the locking plate 74. The positioning lock 77 is released to lockingly couple the locking plate 74 to the back plate 62, and the drill chuck 13 again is manipulated in the above-described fashion, to provide the additional relief on the one cutting lip. By indexing the locking plate 180°, the additional relief is provided on the other one of the cutting lips.

Additional reliefs are provided on the cutting lips, by positionally rotating the locking plate 74 to align its appropriately marked indexing indicia 88 with the index 89 on the back plate 62, and by then manipulating the drill chuck 13 in the described fashion. During each operation, the locking plate 74 is indexed 180° to provide the desired relief on each of its opposite cutting lips. Also, as indicated above, if necessary, the grinding wheel 11 is faced after each of the cutting lips and reliefs is ground on the drill 14. Experience, however, has shown that a complete drill generally can be ground without re-facing the grinding wheel.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A drill grinding apparatus for grinding cutting edges on a drill comprising, in combination: a support surface; a flat grinding surface affixed to said support surface and disposed parallel to and at an angle from the vertical plane of a reference line to provide a relief angle on said drill; a drill chuck for supporting said drill; a swing arm pivotally affixed to said support surface and adapted to be pivotally operated about a pivot point in a horizontal plane parallel to the horizontal plane of said reference line, said pivot point being fixed and establishing a radius with respect to said reference line about which said drill is moved; said drill chuck being affixed to said swing arm with its centerline and the centerline of said drill disposed in the horizontal plane of said reference line and offset a predetermined distance from said pivot point, said radius and said offset being established such that the cutting lips ground on said drill are curved and join substantially tangentially with the diameter thereof; and means coupled to and rotating said drill chuck as said swing arm is pivotally operated to maintain the cutting edge of said drill aligned with said reference line.

2. The drill grinding apparatus of claim 1, further including indexing means coupled to said drill chuck for selectively rotatably indexing said drill chuck to individual ones of a plurality of indexing positions to provide additional reliefs on said drill, and stop means which are engaged by said swing arm, said stop means being positionally adjustable to permit said swing arm to be pivotally operated between predetermined limits cooperatively associated with said indexing positions.

3. The drill grinding apparatus of claim 1, wherein said drill chuck is adjustably affixed to said swing arm and said swing arm is pivotally affixed to means adjustably affixed to said support surface, whereby said radius and said offset can be varied to permit drills of various diameters to be ground on said drill grinding apparatus.

4. The drill grinding apparatus of claim 3, wherein said flat grinding surface is adjustably and pivotally affixed to said support surface to permit the angle from the vertical plane of said reference line at which it is disposed to be varied to provide different relief angles on said drill.

5. The drill grinding apparatus of claim 1, wherein said means coupled to and rotating said drill chuck comprises a cam plate having a cam surface thereon fixedly secured with respect to said swing arm, a cam follower affixed to said swing arm so as to engage and to be operated by said cam surface as said swing arm is pivotally operated, a back plate coupled to said drill chuck and capable of rotating it, and linkage means coupling said cam follower and said back plate adapted to cause said back plate to rotate as said cam follower is operated by said cam surface.

6. The drill grinding apparatus of claim 5, further including indexing means for selectively rotatably indexing said drill chuck to individual ones of a polarity of indexing positions to provide additional reliefs on said drill, said indexing means comprising a lock plate coupled to and capable of rotatng said drill chuck, said back plate being in face-to-face slidable engagement with said lock plate, means on one of said back and lock plates operable to releasably selectively lock said two plates together with said lock plate in one of said plurality of indexing positions, whereby said back plate when rotated by said cam follower causes said lock plate to, in turn, rotate said drill chuck.

7. The drill grinding apparatus of claim 6, wherein said means for releasably locking said back and lock plates together comprises a plurality of indexing apertures in said lock plate correspondingly positioned and representing one of said indexing positions, respectively, a lock pin affixed to said back plate and adapted to be operated to lockingly engage its end in selective ones of said indexing apertures.

8. The grinding apparatus of claim 6, wherein said lock plate is adapted to be releasably coupled to said drill chuck, whereby said drill chuck can be rotated independently of said indexing means.

9. The grinding apparatus of claim 8, wherein said swing arm is affixed to positioning means adapted to be operated to adjustably locate said drill chuck in a work position in spaced relation to said flat grinding surface, whereby a drill can be inserted in said drill chuck and aligned without interference with or from said flat grinding surface.

10. The grinding apparatus of claim 9, further including alignment means for aligning a drill retained within said drill chuck, said alignment means including spindle means disposed in alignment with the intersection of the projected extension of the centerline of said drill chuck and said reference line with said drill chuck located in said work position.

11. The drill grinding apparatus of claim 1, wherein said flat grinding surface comprises a grinding wheel having its grinding face disposed parallel to and at an angle from the vertical plane of said reference line.

12. The drill grinding apparatus of claim 11, further including a diamond dresser supported upon said support surface and positionally adjustable to engage said grinding face of said grinding wheel to re-face it, said diamond dresser being adapted to be moved in a straight line and its path of travel defining said reference line.

13. The drill grinding apparatus of claim 12, wherein said grinding wheel further is adapted to be positionally adjusted longitudinally with respect to said reference line to permit the grinding face thereof to be positioned to be engaged by said diamond dresser to re-face it.

14. The drill grinding apparatus of claim 1 including gauge means for contacting the margin of a drill to be ground rearwardly of its tip to properly angularly position the drill before grinding, the gauge means including a spindle, the tip of which is disposed at the intersection point of the longitudinal axis of the drill chuck and the reference line, whereby after the drill is properly positioned in the drill chuck, it is locked in position in the drill chuck for grinding.

15. The drill grinding apparatus of claim 1 including stop means which are engaged by said swing arm, said stop means being positionally adjustable to permit said swing arm to be pivotally operated between predetermined limits.

References Cited

UNITED STATES PATENTS

| | | | |
|---|---|---|---|
| 3,073,076 | 1/1963 | French. | |
| 2,866,302 | 12/1958 | Amiet | 51—124 X |
| 2,972,839 | 2/1961 | Erdelyi | 51—124 |
| 3,209,493 | 10/1965 | Howser | 51—94 |
| 3,266,194 | 8/1966 | Winslow | 51—94 |

HAROLD D. WHITEHEAD, Primary Examiner

U.S. Cl. X.R.

51—124